United States Patent [19]

Porret et al.

[11] 3,946,034
[45] Mar. 23, 1976

[54] ADDUCTS OF POLYGLYCIDYL COMPOUNDS AND DIALKOXYPHOSPHONO-ALKYL DERIVATIVES OF CYCLIC UREIDES

[75] Inventors: Daniel Porret, Binningen; Jürgen Habermeier, Pfeffingen, both of Switzerland

[73] Assignee: Ciba-Geigy Corporation, Ardsley, N.Y.

[22] Filed: Dec. 7, 1973

[21] Appl. No.: 423,050

[30] Foreign Application Priority Data
Dec. 12, 1972 Switzerland.................... 18032/72

[52] U.S. Cl. .................. 260/309.5; 260/45.8 NE
[51] Int. Cl.² ....................................... C07D 49/32
[58] Field of Search .................. 260/309.5, 2 EP

[56] References Cited
UNITED STATES PATENTS

| | | | |
|---|---|---|---|
| 3,449,353 | 6/1969 | Porret et al. | 260/309.5 |
| 3,629,263 | 12/1971 | Batzer et al. | 260/2 EP X |
| 3,641,193 | 2/1972 | Frank et al. | 260/2 EP X |
| 3,657,282 | 4/1972 | Christensen et al. | 260/309.5 X |
| 3,674,804 | 7/1972 | Redmore | 260/2 EP X |
| 3,741,978 | 6/1973 | Jamison | 260/309.5 |
| 3,787,405 | 1/1974 | Porret et al. | 260/2 EP X |

*Primary Examiner*—Ethel G. Love
*Attorney, Agent, or Firm*—Vincent J. Cavalieri

[57] ABSTRACT

Adducts of polyglycidyl compounds and cyclic ureides containing dialkoxyphosphonoalkyl groups, such as 3-dialkoxyphosphonoalkyl-hydantoins. These adducts are used for the manufacture of flame-retardant epoxide resins.

5 Claims, No Drawings

ADDUCTS OF POLYGLYCIDYL COMPOUNDS AND DIALKOXYPHOSPHONO-ALKYL DERIVATIVES OF CYCLIC UREIDES

The invention relates to adducts of polyglycidyl compounds and cyclic ureides containing dialkoxyphosphonoalkyl groups, such as 3-dialkoxyphosphonoalkyl-hydantoins or 3-dialkoxyphosphonoalkyl dihydrouracils and the use of the adducts for the manufacture of flame-retardant epoxide resins.

In order to manufacture flame-retardant plastics based on epoxide resin it was hitherto necessary either to add flame-retardant agents to the plastics, in which case the quantities required to achieve a good flame-retardant effect impair other properties of the plastics, or it was possible to use epoxide resins containing flame-retardant groups. However, where these were epoxide resins containing phosphorus, they could only be manufactured with difficulty since the addition of the phosphite to the epoxide compounds takes place incompletely (compare Swiss patent specification No. 456,949). The adducts according to the invention, the manufacture of which takes place with high yield, give plastics which in spite of containing relatively low amounts of phosphorus possess very good flame resistance. The latter is better than that of the products described in the cited Swiss patent specification.

These new adducts are reaction products, containing epoxide groups, of polyglycidyl compounds and compounds of the formula I

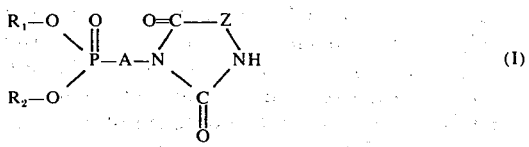

(I)

wherein Z is a nitrogen-free divalent radical required to complete a five-membered or six-membered ring, A is an alkylene group with 1 – 12 carbon atoms which is optionally interrupted by oxygen atoms and $R_1$ and $R_2$ each denote an alkyl or alkenyl group which can be substituted, for example by halogen, or together denote an alkylene group with 2 to 5 carbon atoms.

Z preferably represents a methylene group which can be substituted by alkyl groups with 1 to 6 carbon atoms, or a cycloalkylidene group, such as the methylene group or especially the propylidene-(2,2) group, and also the n- or iso-propylmethylene group, the cyclohexylidene or the cyclopentylidene group, or an ethylene group which is optionally substituted by alkyl groups of 1 to 4 carbon atoms, such as the ethylene 1,2-dimethylethylene, 2,2-dimethylethylene or 1-methyl-2-isopropyl-ethylene group.

A preferably denotes an alkylene group with 2 to 6 carbon atoms, especially the ethylene group, or the radical of a diethyl ether.

$R_1$ and $R_2$ preferably each denote an alkyl or alkenyl group with up to 4 carbon atoms, especially the methyl or ethyl group, but also the propyl, butyl, allyl, butenyl or monochloroethyl group.

The compounds of the formula I are obtained when compounds of the formula II

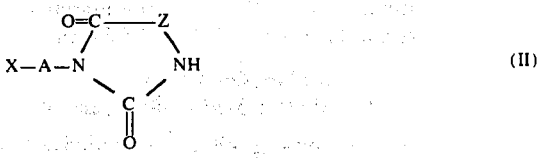

(II)

in which X denotes chlorine or bromine, are reacted with a trialkylphosphite of the formula III

(III)

wherein $R_3$ denotes an optionally substituted alkyl or alkenyl group.

To bring about the reaction, which corresponds to a Michaelis-Arbusow reaction, the mixture is usually warmed for several hours to above 100°C, preferably 120°–160°C, in the course of which $R_3X$ distils off. $R_3X$ is, for example, methyl chloride, ethyl chloride, butyl chloride or 1,2-dichloroethane.

The compounds of the formula II are obtained by reaction of the corresponding hydantoins or dihydrouracils, which are unsubstituted in the 3-position, with a compound of the formula IV $$X-A-X \qquad (IV)$$

in the presence of agents which split off hydrogen halide, such as alkalis or strongly basic salts, for example sodium carbonate. Examples of compounds of the formula IV are $\beta,\beta'$-dichloroethane or $\beta,\beta'$-dichlorodiethyl ether.

The compounds of the formula I are liquid to crystalline substances which are colourless in the pure state. They can be purified by recrystallisation or vacuum distillation.

The addition of the compounds of the formula I to the oxirane groups of the polyglycidyl compounds can be accelerated by customary catalysts such as alkalis, amines, ammonium salts or alkali metal salts. The amounts of the compounds of the formula I, relative to the polyglycidyl compounds, can vary within wide limits and be, for example, 0.05 to 0.5 molecule per epoxide group.

The addition of the polyglycidyl compounds to the compounds of the formula I in the first instance takes place exclusively at the nitrogen atom carrying an active hydrogen atom, in the 1-position of the cyclic ureide. The secondary hydroxyl groups, originating from the glycidyl groups, which are newly formed as a consequence of the addition reaction, also possess reactive hydrogen atoms, which at times subsequently also partly participate in the formation of the a adducts. Accordingly, the adducts are a mixture of chemical compounds which still possess free epoxide groups.

The phosphorus content of the adducts is preferably between 1 and 8% and the adducts are viscous to solid. After curing with customary curing agents, for example acid anhydrides or polyamines, the adducts give flame-resistant plastics having good mechanical properties.

Reaction products of the compounds of the formula I with polyglycidyl compounds of cyclic ureides have proved advantageous with regard to the flame resistance of the adducts.

The 3-(dimethyloxyphosphonoethyl)- and 3-(diethoxyphosphonoethyl)-5,5-dimethyl-hydantoin used, in the examples which follow, for the manufacture of the adducts can be manufactured as follows:

a. Manufacture of 3-(β-chloroethyl)-5,5-dimethyl-hydantoin

A mixture of 1,664 g of 5,5-dimethyl-hydantoin (13.0 mols), 897 g of anhydrous potassium carbonate (6.5 mols), 5,148 g of 1,2-dichloroethane (52 mols) and 1,458 ml of dimethylformamide is reacted for 18 hours and 20 minutes at 90°C to 100°C internal temperature (external temperature 155°C), whilst constantly removing the resulting water of reaction by azeotropic circulatory distillation. Water of reaction eliminated: 110 g (94.0% of theory). Thereafter the reaction mixture, whilst still hot, is separated by filtration from the potassium chloride produced, the filtrate is concentrated on a rotary evaporator at 100°C under a waterpump vacuum and the residue is dried to constant weight at 100°C and $10^{-1}$ mm Hg.

2,385 g of a clear, brown, highly viscous substance (96.2% of theory) are obtained.

The crude product is distilled at 0.1 to 0.2 mm Hg and 146°–149°C: Yield of pure substance, 2,068.3 g (83.4% of theory). A sample recrystallised from methanol melts at 95.8° to 96.2°C.

b. Manufacture of 3-(dimethoxyphosphonoethyl)-5,5-dimethyl-hydantoin

A mixture of 381.3 g of 3-(2'-chloroethyl)-5,5-dimethyl-hydantoin (2.0 mols) and 322.6 g of trimethylphosphite (2.6 mols) is reacted at 120°C (bath temperature 180°C). The methyl chloride produced in the reaction is condensed in a cold trap at −80°C, for the purpose of following the course of the reaction. After 39 hours the reaction has ended, the internal temperature has at that point risen to 190°C, and 96.7 g of methyl chloride (95.7% of theory) are obtained. The reaction product is freed of readily volatile constituents in a waterpump vacuum at 110°C and is then dried to constant weight at $10^{-1}$ mm Hg and 105°C.

490 g of a yellowish, clear, highly viscous crude product (92.7% of theory) are obtained, showing the following analytical data: 9.80% of phosphorus and ≤ 0.2% of chlorine.

A crude product purified by distillation in a bulb tube (at 140°–160°C external temperature and $10^{-1}$ mm Hg) and subsequent crystallisation from ethyl acetate melts at 101.2°–102.6°C.

c. Manufacture of 3-(diethoxyphosphonoethyl)-5,5-dimethyl-hydantoin 704.1 g of 3-(2'-chloroethyl)-5,5-dimethyl-hydantoin (3.0 mols) and 598.5 g of triethylphosphite are stirred at 162° to 188°C. The elimination of ethyl chloride is complete after 22 hours and 20 minutes and the reaction product is worked up analogously to Example 1. 859.8 g of a yellow, clear, viscous substance (98.0% of theory), containing 8.6% of phosphorus, are obtained.

EXAMPLE 1

200 g of an industrially manufactured triglycidyl compound from 1,3-bis-(5,5-dimethyl-hydantoinyl-3)-propan-2-ol, having an epoxide content of 6.1 epoxide equivalents/kg, and 133.3 g of 3-(dimethoxyphosphonoethyl)-5,5-dimethyl-hydantoin (0.505 mol) are stirred at 156°–159°C internal temperature (bath temperature 180°C). The reaction is followed by continuous determination of the epoxide content. After 35 minutes' reaction time, the epoxide content is 3.0 epoxide equivalents/kg and after 90 minutes it is 2.58 epoxide equivalents/kg. The reaction is complete after 125 minutes and the reaction product is cooled to room temperature by pouring out onto a metal sheet. A brownish, brittle, somewhat tacky resin having an epoxide content of 2.26 epoxide equivalents/kg is obtained in practically quantitative yield (theory: 333.3 g). The phosphorus content is 3.98% P.

The IR spectrum shows, through the absence of the NH band and the presence of the OH band, that the reaction has taken place in the desired manner.

100 g of the epoxide resin adduct thus produced and 33.0 g of hexahydrophthalic anhydride are stirred together at 120°C and the clear, yellowish mixture is poured into aluminium moulds of sizes 120×120×4 mm and 120×15×10 mm, which have been prewarmed to 120°C.

Curing is effected in 2 hours at 120°C and 16 hours at 150°C. The mouldings thus obtained have the following properties:

| | |
|---|---|
| Phosphorus content: | 3.0% P |
| Flexural strength (VSM 77,103): | 9.1–12.8 kg/mm² |
| Deflection (VSM 77,103): | 3.7–4.0 mm |
| Impact strength (VSM 77,105): | 9.0–15.5 cmkg/cm² |
| Heat distortion point according to Martens (DIN) | 77°C |
| Inflammability according to CTM 20* | Level 1/1" |
| *CTM 20: Description of the test: | |

A horizontally clamped DIN standard bar (120×15×10 mm) of the plastic which is to be tested is exposed for 1 minute to the flame of a Bunsen burner which is inclined at 45° and fed with town gas (burner orifice: 9 mm, flame height with burner vertical: 10 cm), so that the 15 mm wide surface of the test specimen is 3 cm above the upper edge of the burner and the end face is at a horizontal distance of 1 cm from the lower edge of the burner.

EXAMPLE 2

A mixture of 200 g of industrially manufactured 1,3-diglycidyl-5,5-dimethyl-hydantoin having an epoxide content of 7.85 epoxide equivalents/kg, and 133.3 g of 5-(dimethoxyphosphonoethyl)-5,5-dimethyl-hydantoin(0.505 mol) is reacted for 2 hours and 43 minutes at 149°–160°C. 330 g of a clear, firm, tacky resin (99.0% of theory) having an epoxide content of 2.82 epoxide equivalents/kg are obtained. The resin contains 4.15% of phosphorus.

100 parts of this adduct and 41.3 g of hexahydrophthalic anhydride are stirred together at 120°C to give a homogeneous mixture and the latter is processed and cured analogously to Example 1. Mouldings having the following properties are obtained:

| | |
|---|---|
| Phosphorus content: | 2.93% P |
| Heat distortion point according to Martens (DIN) | 85°C |
| Inflammability according to CTM 20 | Level 1/1" |

EXAMPLE 3

A mixture of 200 g of commercially available 3-(3,4-epoxycyclohexyl)-2,4-dioxaspiro-(5,5)-9,10-epoxyundecane having an epoxide content of 6.2 epoxide equivalents/kg, 133.3 g of 3-(dimethoxyphosphonoethyl)-5,5-dimethyl-hydantoin (0.505 mol) and 0.5 ml of 40% strength tetramethylammonium chloride solution in methanol is reacted at 163°–173°C internal temperature (bath temperature 180°–186°C). After a reaction time of 3.5 hours, 0.5 ml of 50% strength aqueous sodium hydroxide solution is added. The course of the reaction is followed by titration, analogously to Example 1. The reaction is complete after 16 hours and 20 minutes, and 330 g of a clear, ochre-coloured, solid, tacky resin (99.0% of theory) having an epoxide content of 2.14 epoxide equivalents per kg are obtained. Phosphorus content: 4.06%.

A mixture of 100 parts of the adduct and 31.3 g of hexahydrophthalic anhydride is stirred at 120°C, poured into aluminium moulds prewarmed to 120°C, and cured, all as described in Example 1.

| Test results | |
|---|---|
| Phosphorus content: | 3.09% P |
| Distortion point according to Martens (DIN 5B461): | 101°C |
| Inflammability (CTM 20): | Level 1/10''–15''. |

EXAMPLE 4

24 g of an industrially manufactured bisphenol A diglycidyl ether with 5.3 epoxide equivalents/kg and 11.3 g of 3-(diethoxyphosphonoethyl)-5,5-dimethyl-hydantoin (0.089 mol) are stirred at 170°C analogously to Example 1. After 1 hour and 20 minutes the reaction is complete and a yellow, clear, very highly viscous resin with 2.46 epoxide equivalents/kg is obtained in practically quantitative yield (25.3 g). Phosphorus content: 3.21% P.

The resin can be processed in the same manner as that described in the preceding examples.

What we claim is:

1. An adduct, containing epoxide groups, consisting essentially of the reaction product of a polyglycidyl compound selected from the group consisting of polyglycidyl compounds of cyclic ureides, polyglycidyl compounds of bisphenol A, and a cycloaliphatic polyglycidyl compound and a compound of the formula

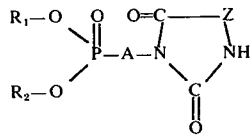

wherein Z is methylene, methylene substituted by alkyl groups of 1-6 carbon atoms, cyclopentylidene or cyclohexylidene; A is alkylene of 1-12 carbon atoms, or $-CH_2CH_2O\ CH_2CH_2-$; and $R_1$ and $R_2$ each is alkyl or alkenyl with up to 4 carbon atoms, or $R_1$ and $R_2$ together are alkylene of 2–5 carbon atoms.

2. An adduct according to claim 1 wherein Z is propylidene-(2,2).

3. An adduct according to claim 1 wherein Z is cyclohexylidene.

4. An adduct according to claim 1 wherein $R_1$ and $R_2$ each is alkyl or alkenyl with up to 4 carbon atoms.

5. An adduct according to claim 1 wherein $R_1$ and $R_2$ is methyl, or ethyl.

* * * * *